(12) United States Patent
Yamashita et al.

(10) Patent No.: US 11,022,843 B2
(45) Date of Patent: Jun. 1, 2021

(54) LIQUID CRYSTAL DISPLAY APPARATUS

(71) Applicant: PANASONIC INTELLECTUAL PROPERTY MANAGEMENT CO., LTD., Osaka (JP)

(72) Inventors: Shuji Yamashita, Nara (JP); Hisanori Sasaki, Osaka (JP); Satoru Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/080,214

(22) Filed: Oct. 26, 2020

(65) Prior Publication Data

US 2021/0041621 A1 Feb. 11, 2021

Related U.S. Application Data

(63) Continuation of application No. PCT/JP2019/012244, filed on Mar. 22, 2019.

(30) Foreign Application Priority Data

Apr. 27, 2018 (JP) .............................. JP2018-086778

(51) Int. Cl.
*G02F 1/1335* (2006.01)
*F21V 8/00* (2006.01)
*G02F 1/1333* (2006.01)

(52) U.S. Cl.
CPC ..... *G02F 1/133616* (2021.01); *G02B 6/0091* (2013.01); *G02F 1/133308* (2013.01); *G02F 1/133553* (2013.01)

(58) Field of Classification Search
None
See application file for complete search history.

(56) References Cited

U.S. PATENT DOCUMENTS

| 2003/0030765 | A1 | 2/2003 | Hayashi et al. |
| 2016/0187715 | A1* | 6/2016 | Choi ..................... G02F 1/1336 349/63 |
| 2017/0199423 | A1* | 7/2017 | Cheng ............... G02F 1/133553 |

FOREIGN PATENT DOCUMENTS

| EP | 1 306 714 A1 | 5/2003 |
| JP | 2002-122861 A | 4/2002 |

(Continued)

OTHER PUBLICATIONS

International Search Report issued in International Patent Application No. PCT/JP2019/012244, dated Jun. 4, 2019; with English translation.

*Primary Examiner* — Phu Vu

(74) *Attorney, Agent, or Firm* — McDermott Will and Emery LLP

(57) ABSTRACT

A liquid crystal display apparatus includes a quadrangular liquid crystal panel having a reflection layer on a back surface opposite to a display surface, a light guiding plate that diffusely reflects light incident from one end surface of the light guiding plate toward the display surface, a backside frame disposed in parallel with the liquid crystal panel on a side opposite to the light guiding plate, and a light source holding plate including a light source fixing plate that faces the one end surface and a fixing plate portion fixed to a surface of the back-side frame on a side opposite to the liquid crystal panel. A light source is mounted on the light source fixing plate, and the fixing plate portion is formed so as to be bent perpendicularly to the light source fixing plate.

6 Claims, 16 Drawing Sheets

(56) References Cited

FOREIGN PATENT DOCUMENTS

| | | | |
|---|---|---|---|
| JP | 2002-162912 | A | 6/2002 |
| JP | 2002-258281 | A | 9/2002 |
| JP | 2003-114417 | A | 4/2003 |
| JP | 2014-048322 | A | 3/2014 |
| WO | 02/10854 | A1 | 2/2002 |

* cited by examiner

LIQUID CRYSTAL DISPLAY APPARATUS

CROSS-REFERENCE OF RELATED APPLICATIONS

This application is a U.S. Continuation of International Patent Application No. PCT/JP2019/012244, filed on Mar. 22, 2019, which in turn claims the benefit of Japanese Application No. 2018-086778, filed on Apr. 27, 2018, the entire disclosures of which Applications are incorporated by reference herein.

BACKGROUND OF THE INVENTION

1. Field of the Invention

The present disclosure relates to a liquid crystal display apparatus.

2. Description of the Related Art

JP-A-2014-48322 discloses a liquid crystal display apparatus in which a flexible wiring substrate on which an LED is mounted is connected to an end portion of a TFT substrate. The flexible wiring substrate is folded back to a back surface of a mold, and the LED is disposed on a side surface of a light guiding plate of a backlight. The flexible wiring substrate is further folded back and extends on a surface of the TFT substrate, and is fixed to a liquid crystal display panel by a double-sided adhesive tape. The flexible wiring substrate is further sandwiched and fixed between a claw portion formed on a metal frame and the mold.

SUMMARY OF THE INVENTION

The present disclosure has been devised in view of the related-art circumstances described above, and an object thereof is to provide a liquid crystal display apparatus that secures strength of the liquid crystal display apparatus while achieving a thin structure in which a liquid crystal panel and a back-side frame can be close to each other.

The present disclosure provides a liquid crystal display apparatus including: a quadrangular liquid crystal panel having a reflection layer on a back surface opposite to a display surface of the liquid crystal panel; a light guiding plate formed in a quadrangular shape substantially the same as that of the liquid crystal panel, being laminated on the display surface, and configured t diffusely reflect light incident from one end surface of the light guiding plate and emit the light toward the display surface; a back-side frame formed in a quadrangular shape substantially the same as that of the liquid crystal panel, configured to sandwich the liquid crystal panel, and disposed in parallel with the liquid crystal panel on a side opposite to the light guiding plate, and in which bent side plate portions that restrict a position of the light guiding plate are respectively provided on a pair of side portions that sandwich one side portion of the back-side frame along the one end surface; and a light source holding plate includes a light source fixing plate which faces the one end surface and a fixing plate portion which is fixed to a surface of the back-side frame on a side opposite to the liquid crystal panel, in which a light source that causes light to be incident on the one end surface is mounted on the light source fixing plate, and the back-side frame fixing plate portion is formed so as to be bent perpendicularly to the light source fixing plate.

According to the present disclosure, in the liquid crystal display apparatus, the strength of the apparatus can be secured while achieving the thin structure in which the liquid crystal panel and the back-side frame can be close to each other.

DETAILED DESCRIPTION OF THE EXEMPLARY EMBODIMENTS (Background to Contents of First Embodiment)

In a related transmissive liquid crystal display apparatus, a light guiding plate is disposed on a back side of a liquid crystal panel. Since a back-side frame that supports the liquid crystal panel and the light guiding plate is disposed on a side opposite to the liquid crystal panel with respect to the light guiding plate and sandwiches the light guiding plate together with the liquid crystal panel. Therefore, a bent portion corresponding to a thickness of the light guiding plate can be formed on each side portion of the back-side frame. On the contrary, in a reflective liquid crystal display apparatus that can provide high visibility even in an environment under sunlight, a light guiding plate is disposed on a display surface side of a liquid crystal panel. As a result, when it is attempted to reduce a thickness of the liquid crystal display apparatus, the back-side frame is disposed immediately on a side opposite to the light guiding plate with respect to the liquid crystal panel sandwiched between the back-side frame and the light guiding plate. Therefore, a bent portion that blocks lead-out of a flexible wiring substrate cannot be formed on one side portion of the back-side frame along an end surface of the liquid crystal panel from which the flexible wiring substrate is led out. In the back-side frame, the one side portion where no bent portion can be formed tends to bend toward front and back surface sides, and it may be difficult to secure strength of the liquid crystal display apparatus.

Hereinafter, a liquid crystal display apparatus that secures its strength will be described.

Hereinafter, an embodiment specifically disclosing a liquid crystal display apparatus according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It is to be understood that the accompanying drawings and the following description are provided to enable those skilled in the art to fully understand the present disclosure, and are not intended to limit the range of the claims.

First Embodiment

Figure 1:
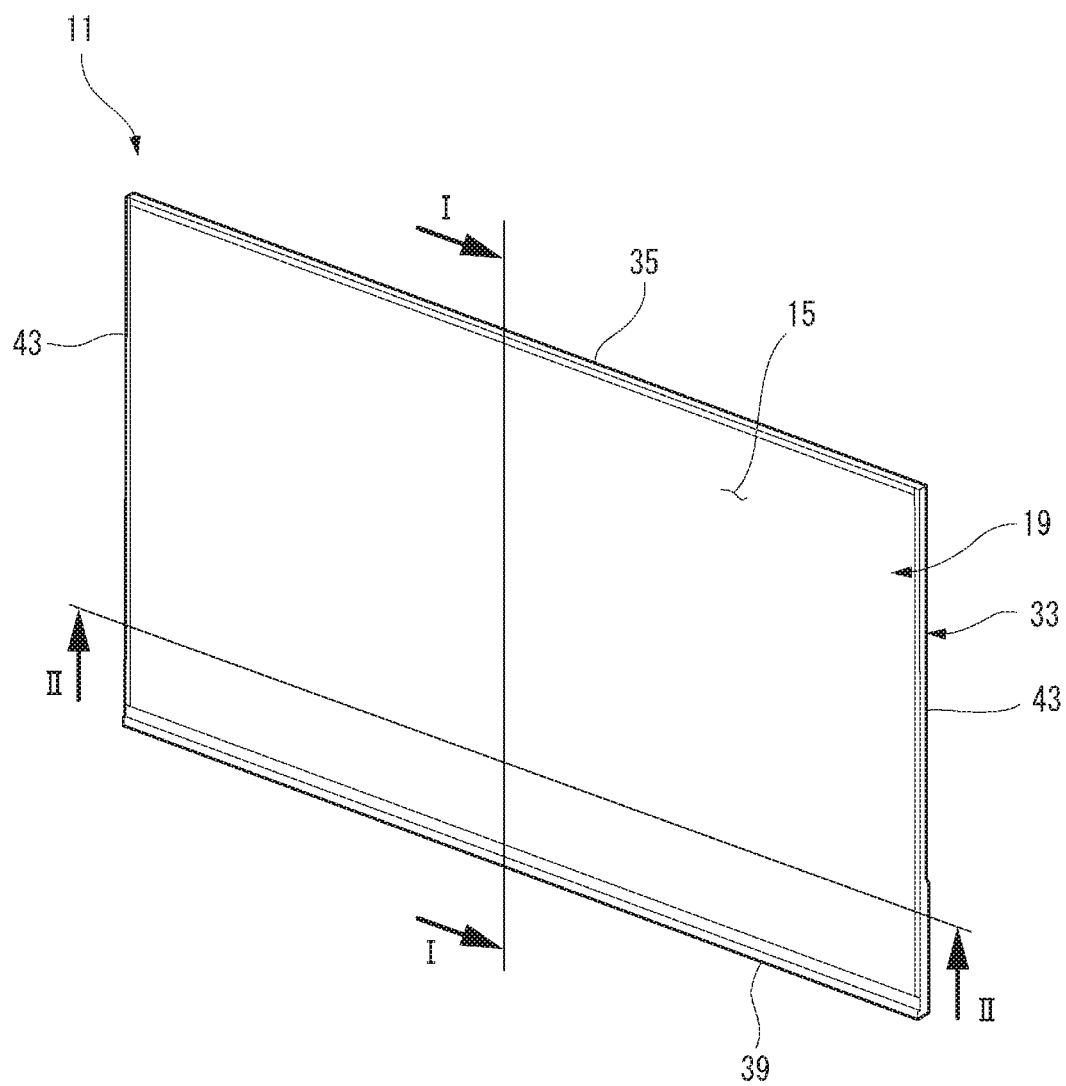
FIG. 1 is a perspective view of an external appearance of a liquid crystal display apparatus according to a first embodiment.

FIG. 1 is a perspective view of an external appearance of a liquid crystal display apparatus 11 according to a first embodiment. The liquid crystal display apparatus 11 according to the first embodiment includes a liquid crystal panel 13, a light guiding plate 15, and a frame 17 as main components.

In the liquid crystal display apparatus 11, a front light 19 is provided on a surface side of the reflective liquid crystal panel 13 as an auxiliary light source. The front light 19 is configured by the light guiding plate 15 and LEDs 21 that is a light source. The liquid crystal panel 13 does not emit light by itself, changes a transmission intensity of light so as to perform display, and can be driven with an effective voltage of, for example, several volts. The reflective liquid crystal panel 13 includes a reflection layer 23 on a lower side and performs display using reflected light from the reflection layer 23 of external light. Therefore, power consumption is extremely low. In the liquid crystal display apparatus 11, the reflective liquid crystal panel 13 includes the front light 19. Accordingly, high visibility under sunlight and visibility at night are made possible. Then, as compared with a transmissive liquid crystal panel including a backlight used in a related-art mobile phone or the like, a cooling fan can also be eliminated. Therefore, the power consumption can be significantly reduced.

In the first embodiment, the light source is not limited to the LED 21 and may be, for example, a cold cathode fluorescence lamp called a CCFL.

Figure 2:
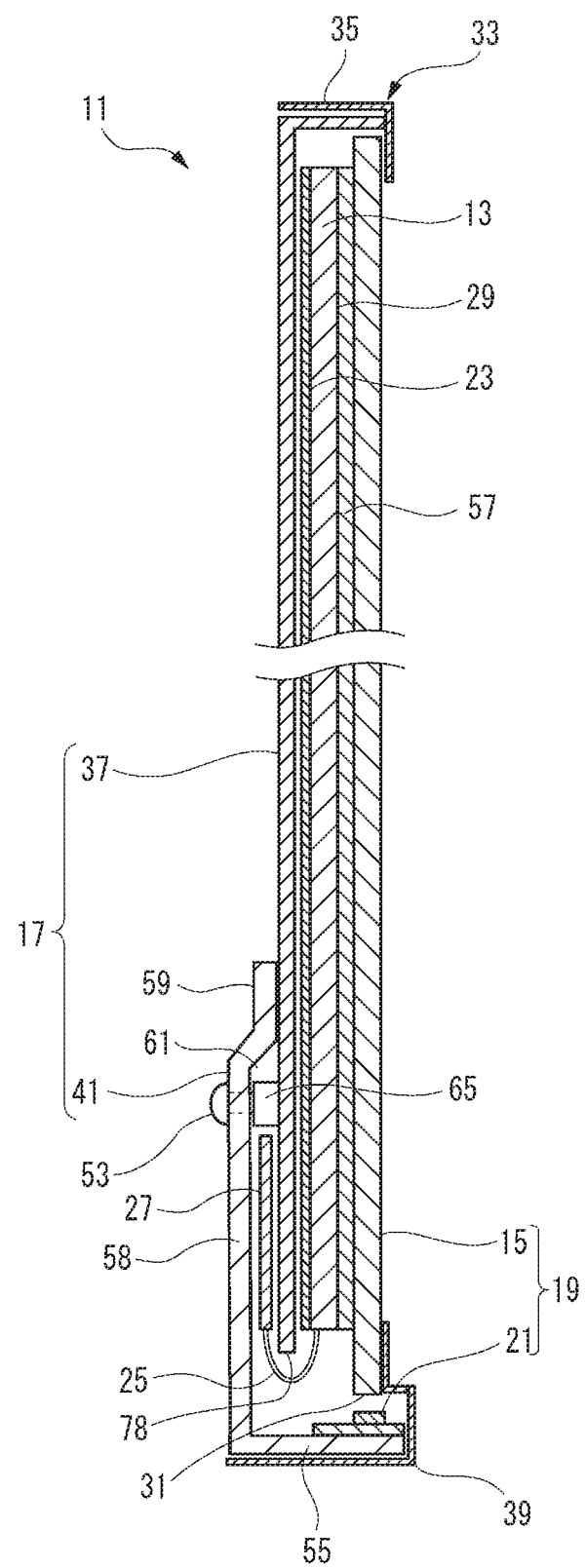
FIG. 2 is a cross-sectional view taken along a line I-I in FIG. 1.

FIG. 2 is a cross-sectional view taken along a line I-I in FIG. 1. The liquid crystal panel 13 is configured by sandwiching a liquid crystal between a quadrangular upper glass on which a segment electrode group is formed and a quadrangular lower glass on which a common electrode group is formed. The liquid crystal is sealed in a gap between the upper glass and the lower glass and an outer periphery thereof is sealed. The segment electrode group and the common electrode group are connected to one end of, for example, an FFC 25 (flexible flat cable) or an FPC (flexible printed wiring board) in which a conductor is pattern-printed on a flexible insulation substrate. The other end of the FFC 25 or the like is connected, by a relay substrate 27, to a driver or the like that drives the liquid crystal.

In the first embodiment, the liquid crystal panel 13 is formed to have a size of, for example, 32 inches. The size of the liquid crystal panel 13 is not limited thereto.

The relay substrate 27 supplies an electrical signal or electrical energy that drives the liquid crystal panel 13. The liquid crystal panel 13 displays a desired image on a display surface 29 by the electrical signal or the electrical energy supplied from the relay substrate 27.

The liquid crystal display apparatus 11 includes the reflection layer 23 disposed on a back surface opposite to the display surface 29. The reflection layer 23 may be provided as a reflection plate on the lower glass, or may be attached as a reflection sheet to the lower glass. The reflection layer 23 reflects external light transmitted through the light guiding plate 15 and the liquid crystal panel 13 toward the liquid crystal panel 13. Further, the reflection layer 23 reflects light emitted from the light guiding plate 15 and transmitted through the liquid crystal panel 13 toward the liquid crystal panel 13.

The light guiding plate 15 is formed in a quadrangle substantially the same as that of the liquid crystal panel 13. The shapes of the liquid crystal panel 13 and the light guiding plate 15 may not be formed in a quadrangular shape as long as a condition is satisfied under which the liquid crystal panel 13 and the light guiding plate 15 are positioned by the light guiding plate 15 and a back-side frame 37 in the vicinity of end portion sides of one side along one end surface 31. In the first embodiment, the light guiding plate 15 is formed of a transparent plate material made of acrylic resin. The light guiding plate 15 is not limited to the acrylic resin, and may be, for example, glass.

The light guiding plate 15 is laminated on the display surface 29 of the liquid crystal panel 13. The light guiding plate 15 diffusely reflects light incident from the one end surface 31 and emits the light toward the display surface 29 of the liquid crystal panel 13. The light guiding plate 15 has, for example, a prism processing performed on a surface side and an anti-reflection material applied on a back surface side. The light incident from the one end surface 31 of the light guiding plate 15 propagates through the light guiding plate 15 as a medium, and a part thereof is reflected by a prism-processed portion on the surface side and emitted as diffused light toward a liquid crystal panel side. Accordingly, the light guiding plate 15 has a function of reflecting light from the LEDs 21 and causing the light to be incident on the liquid crystal panel 13, a function of transmitting light reflected by the reflection layer 23 to an outside, and a function of transmitting light from the outside to the liquid crystal panel 13.

The light guiding plate 15 is adhered to the display surface 29 of the liquid crystal panel 13 by an adhesive layer 57 to be described later. A peripheral edge of the light guiding plate 15 integrated with the liquid crystal panel 13 is held on the frame 17 by a frame member 33 (so-called bezel). The frame member 33 is fixed (screwed) to the frame 17 by a screw that is a fastener. A bezel upper side 35 is screwed to the back-side frame 37 that constitutes the frame 17. A bezel lower side 39 is screwed to an LED holding plate 41 that constitutes the frame 17.

Figure 3:
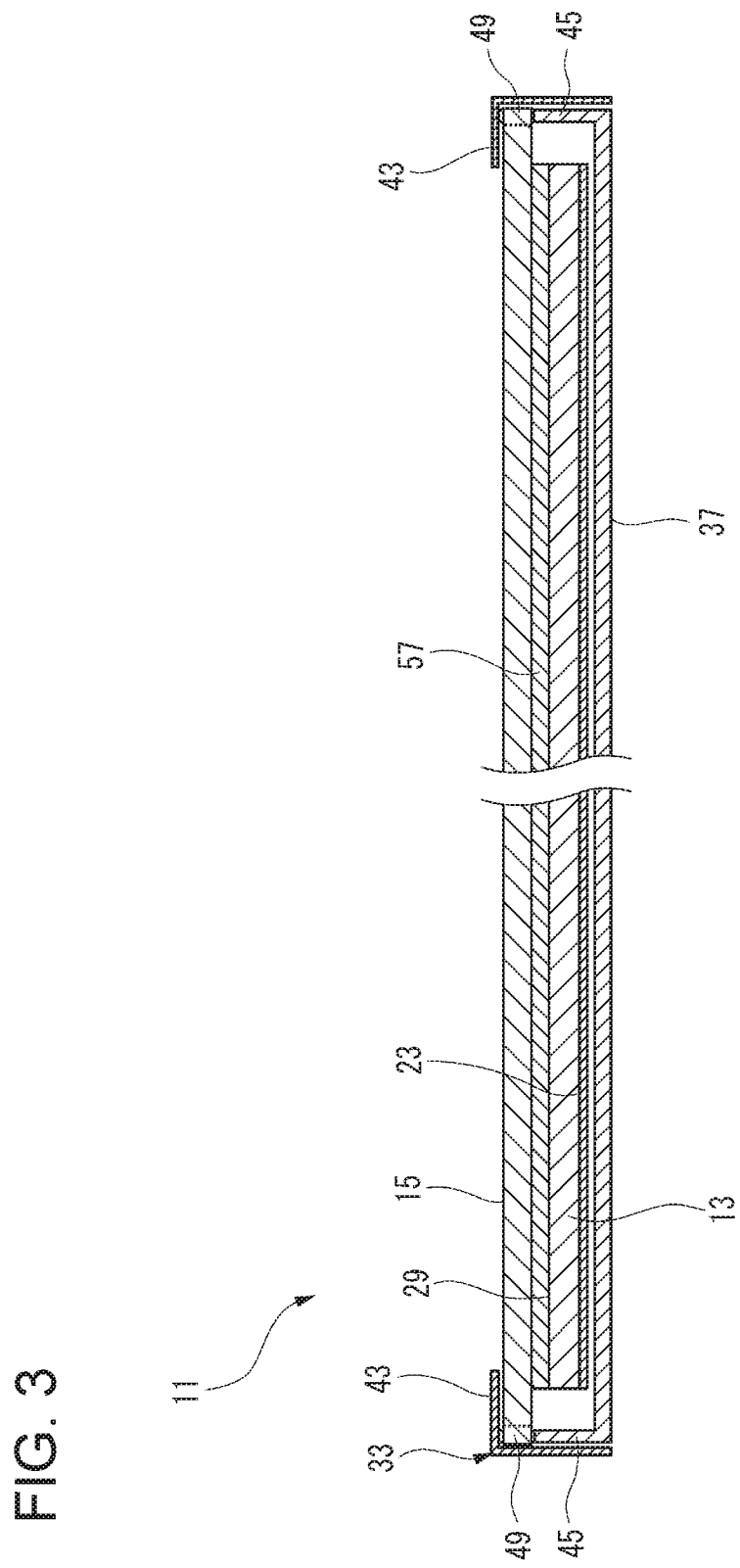
FIG. 3 is a cross-sectional view taken along a line II-II in FIG. 1.

FIG. 3 is a cross-sectional view taken along a line II-II in FIG. 1. Bezel lateral sides 43 are respectively screwed to bent side plate portions 45 of the back-side frame 37.

The light guiding plate 15 includes a pair of convex portions 49 (see FIG. 8 for details) that protrude outward from a pair of parallel adjacent end surfaces 47 (see FIG. 7 for an example of the end surfaces) that sandwich the one end surface 31. As will be described later, one of the pair of convex portion 49 is fitted into a notch 51 provided in the back-side frame 37.

Figure 4:
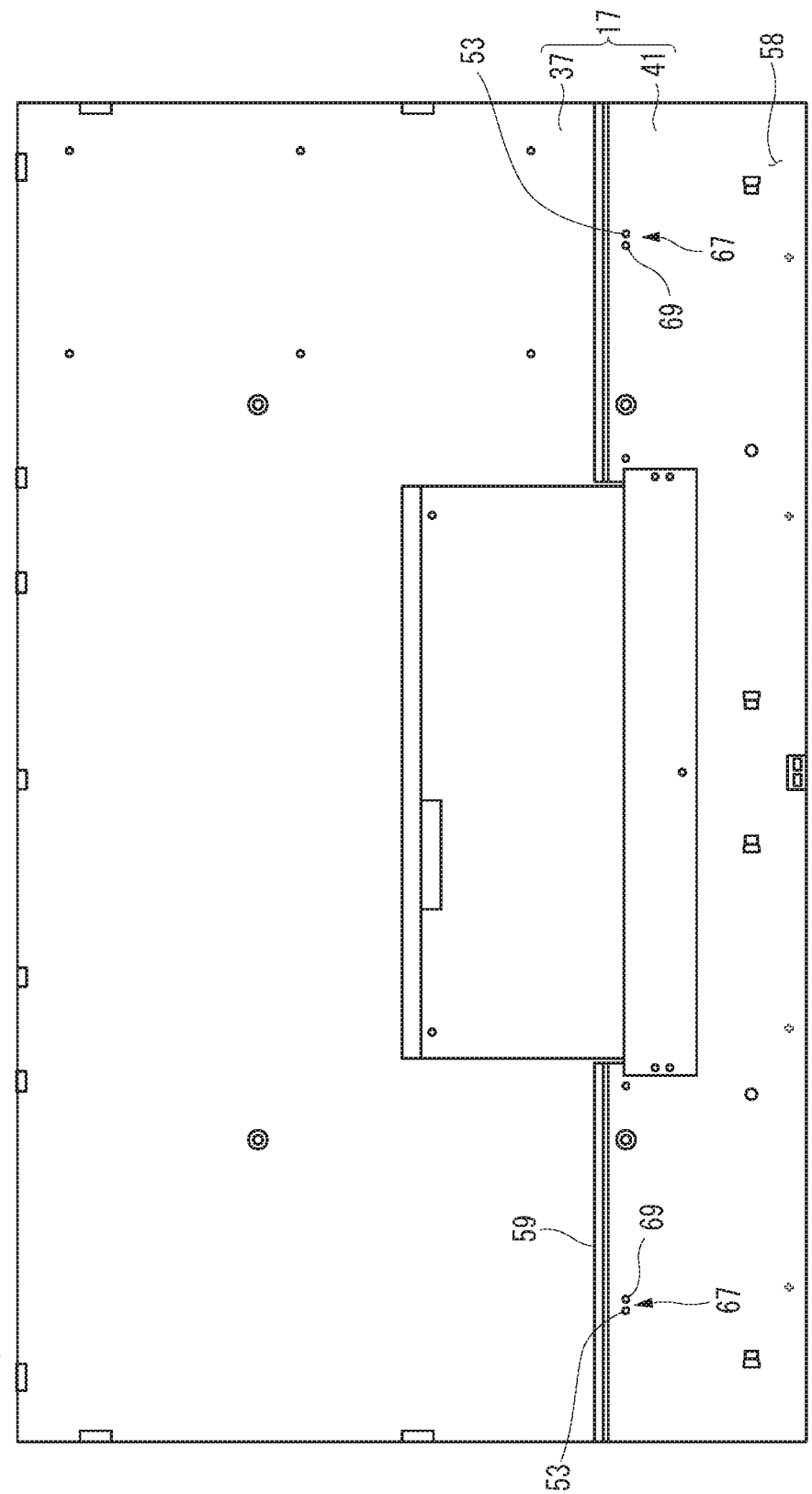
FIG. 4 is a rear view of the liquid crystal display apparatus shown in FIG. 1.

FIG. 4 is a rear view of the liquid crystal display apparatus 11 shown in FIG. 1. In the first embodiment, in the frame 17, the back-side frame 37 and the LED holding plate 41 that are separately formed are integrally fixed by screws 53 as fasteners. The back-side frame 37 is formed in a quadrangular shape substantially the same as that of the liquid crystal panel 13. The LED holding plate 41 is formed in a long shape that extends along the one end surface 31.

In the frame 17, the back-side frame 37 and the LED holding plate 41 may be integrally formed by a single metal plate.

Figure 5:
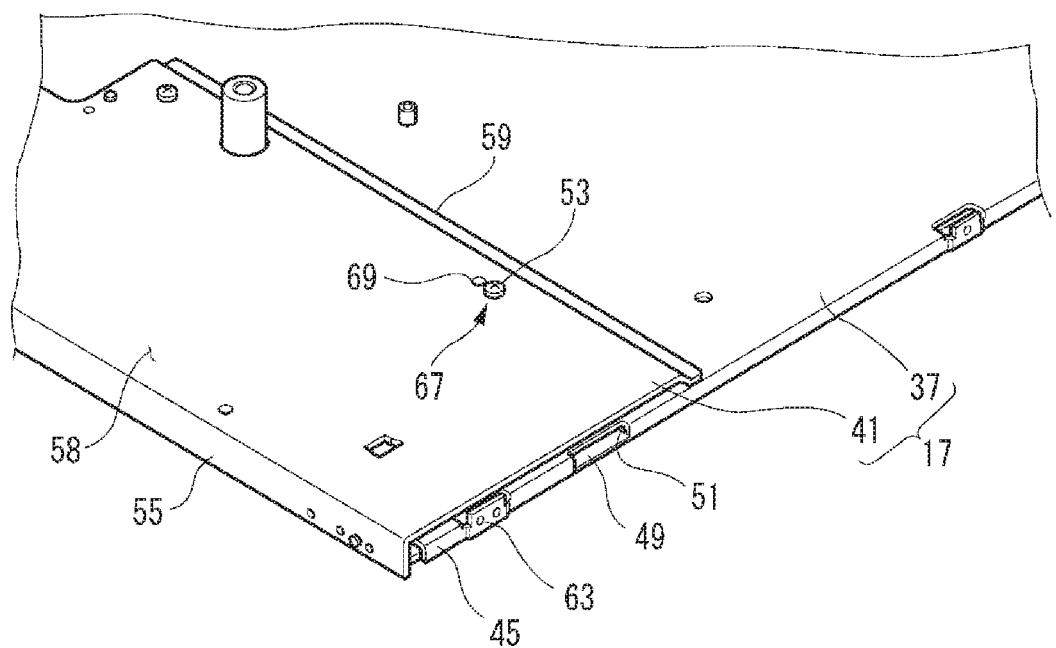
FIG. 5 is a perspective view of one end portion of an LED holding plate shown in FIG. 4 in an extending direction.

FIG. 5 is a perspective view of one end portion in the extending direction of the LED holding plate 41 shown in FIG. 4. The LED holding plate 41 includes an LED fixing plate 55 that is bent perpendicularly to the back-side frame 37 and faces the one end surface 31 of the light guiding plate 15. In other words, the LED holding plate 41 and the LED fixing plate 55 are formed by bending one plate material perpendicularly to the back-side frame 37, so that a plate material portion parallel to the back-side frame 37 and a plate material portion perpendicular to the back-side frame 37 (that is, the LED fixing plate 55) are formed. In the LED holding plate 41, a plate material portion parallel to the back-side frame 37 serves as a back-side frame fixing plate portion 58. On the LED fixing plate 55 of the LED holding plate 41, a plurality of LEDs 21 that cause light to be incident on the one end surface 31 of the light guiding plate 15 are linearly arranged at equal intervals (see FIGS. 2 and 7).

Figure 6:
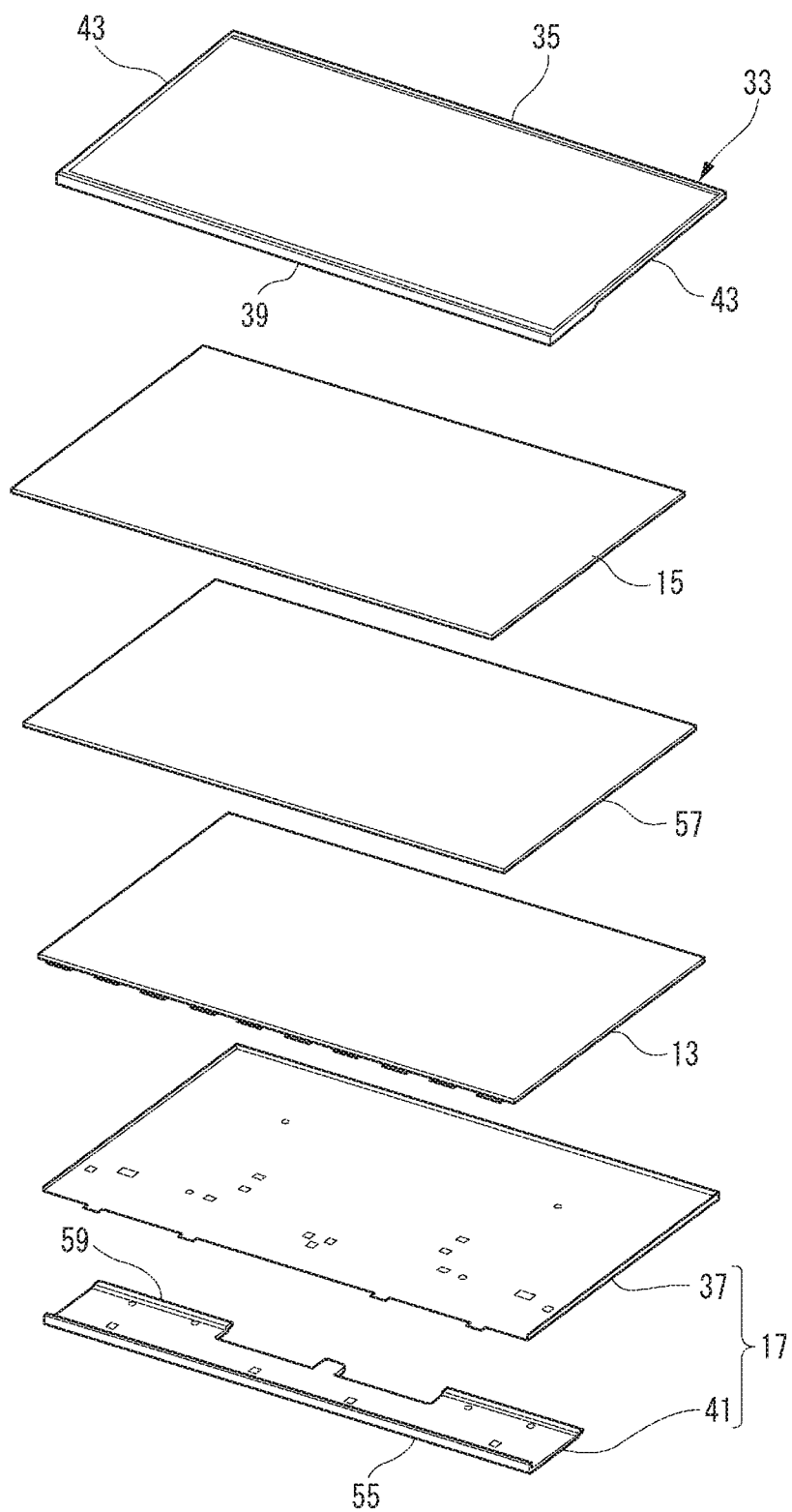
FIG. 6 is an exploded perspective view of members laminated between a light guiding plate and the LED holding plate.

FIG. 6 is an exploded perspective view of members laminated between the light guiding plate 15 and the LED holding plate 41. In the liquid crystal display apparatus 11, the light guiding plate 15 is closely fixed to the display surface 29 of the liquid crystal panel 13 via the adhesive layer 57. In the liquid crystal display apparatus 11, the back-side frame 37, the liquid crystal panel 13, the adhesive layer 57, and the light guiding plate 15 are sequentially laminated from a lower layer side of the liquid crystal display apparatus 11. Among them, the liquid crystal panel 13 and the light guiding plate 15 are integrally assembled by the adhesive layer 57. The light guiding plate 15 to which the liquid crystal panel 13 is integrally fixed is positioned on the back-side frame 37. The frame member 33 is screwed to the back-side frame 37 and the LED holding plate 41, so that the light guiding plate 15 positioned on the back-side frame 37 is held by the frame member 33 and the frame 17.

In the first embodiment, the liquid crystal display apparatus 11 is assembled with the back-side frame 37 and the liquid crystal panel 13 not being fixed.

In the liquid crystal display apparatus 11, the LED holding plate 41 is formed of a metal plate thicker than a plate thickness of the back-side frame 37.

In the liquid crystal display apparatus 11, a Z-bent portion 59 (see FIG. 2) is formed on a side opposite to the LED fixing plate 55 of the LED holding plate 41. The LED holding plate 41 has a component housing space 61 formed between the back-side frame 37 and the LED holding plate 41 (see FIG. 2) by abutting a tip end of the Z-bent portion 59 against the back-side frame 37.

Figure 7:
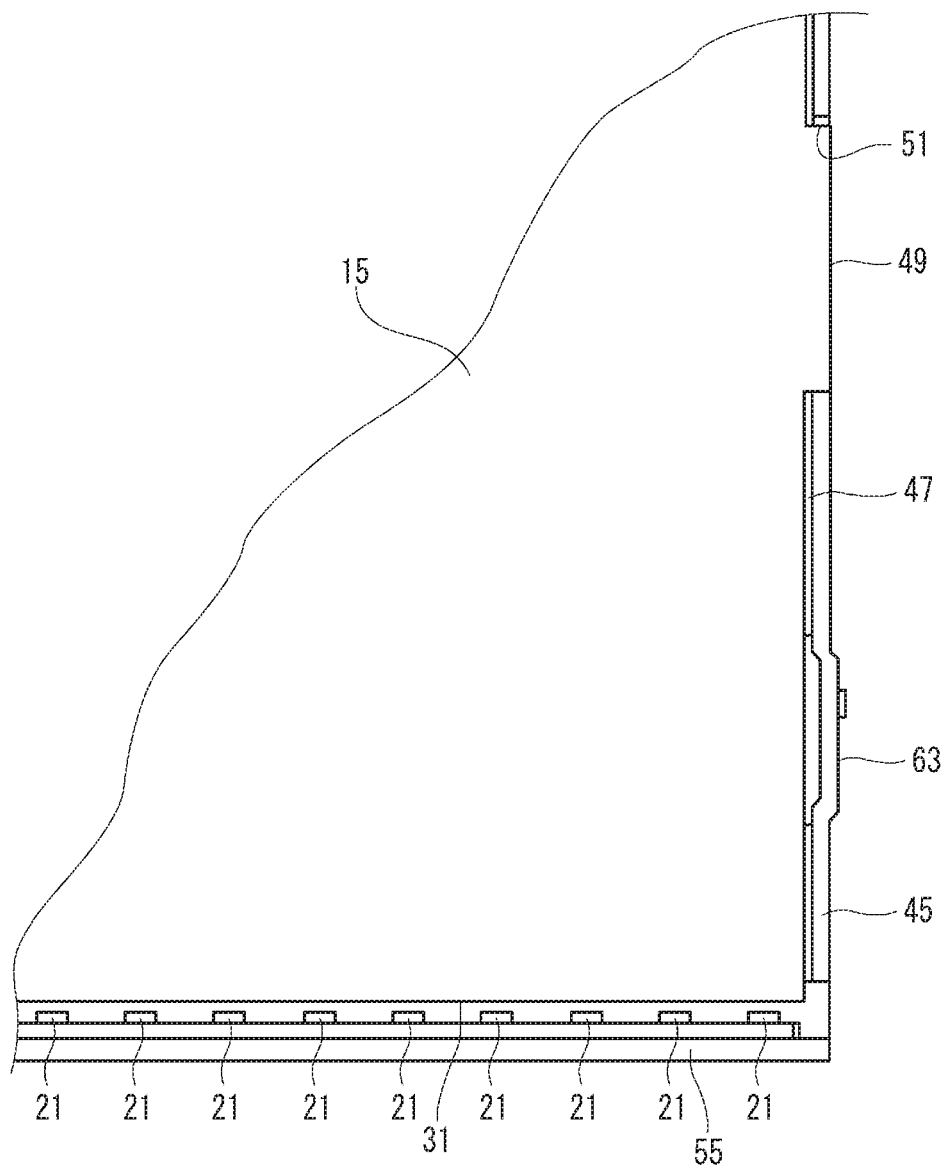
FIG. 7 is a plan view of a fitting structure including a convex portion and a notch.

FIG. 7 is a plan view of a fitting structure including a convex portion 49 and a notch 51. In the light guiding plate 15 integrated with the liquid crystal panel 13, the convex portions 49 that protrude from both sides along the extending direction of the one end surface 31 are fitted into the notches 51 of the back-side frame 37. With this fitting structure, movement of the light guiding plate 15 in a surface direction is restricted, and the light guiding plate 15 is positioned on the back-side frame 37. The liquid crystal panel 13 adhered to and integrated with the light guiding plate 15 is also similarly positioned on the back-side frame 37 via the light guiding plate 15.

Figure 8:
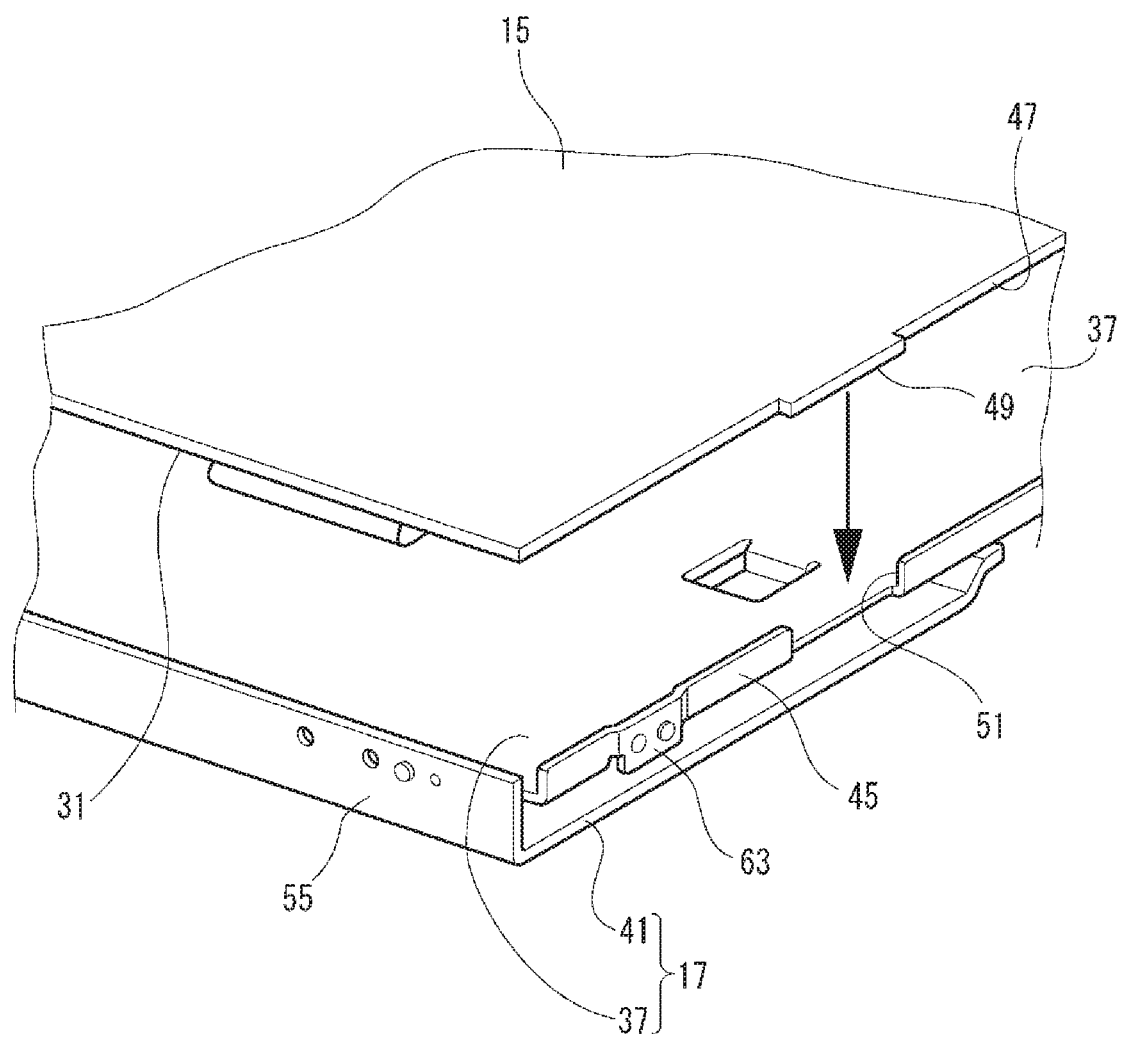
FIG. 8 is an exploded perspective view of the fitting structure including the convex portion and the notch.

FIG. 8 is an exploded perspective view of the fitting structure including the convex portion 49 and the notch 51. In the back-side frame 37, the bent side plate portions 45 that face a pair of adjacent end surfaces 47 of the light guiding plate 15 are formed on a pair of adjacent side portions that sandwich the LED fixing plate 55, respectively. Then, the pair of bent side plate portions 45 are provided with the notches 51 into which the convex portions 49 of the light guiding plate 15 are fitted. The convex portions 49 of the light guiding plate 15 are formed in the vicinity of the one end surface 31 on the pair of parallel adjacent end surfaces 47 that sandwich the one end surface 31. Therefore, the notches 51 into which the convex portions 49 are fitted are also formed in the vicinity of the one end surface 31 in the pair of bent side plate portions 45. Each of the convex portions 49 is formed with a protrusion length of, for example, about 2 mm. A frame-member-fixing bulging portion 63 for fixing the frame member 33 is formed on a bent side plate portion 45 on a light source fixing plate side of the LED holding plate 41 with respect to a notch 51.

Figure 9:
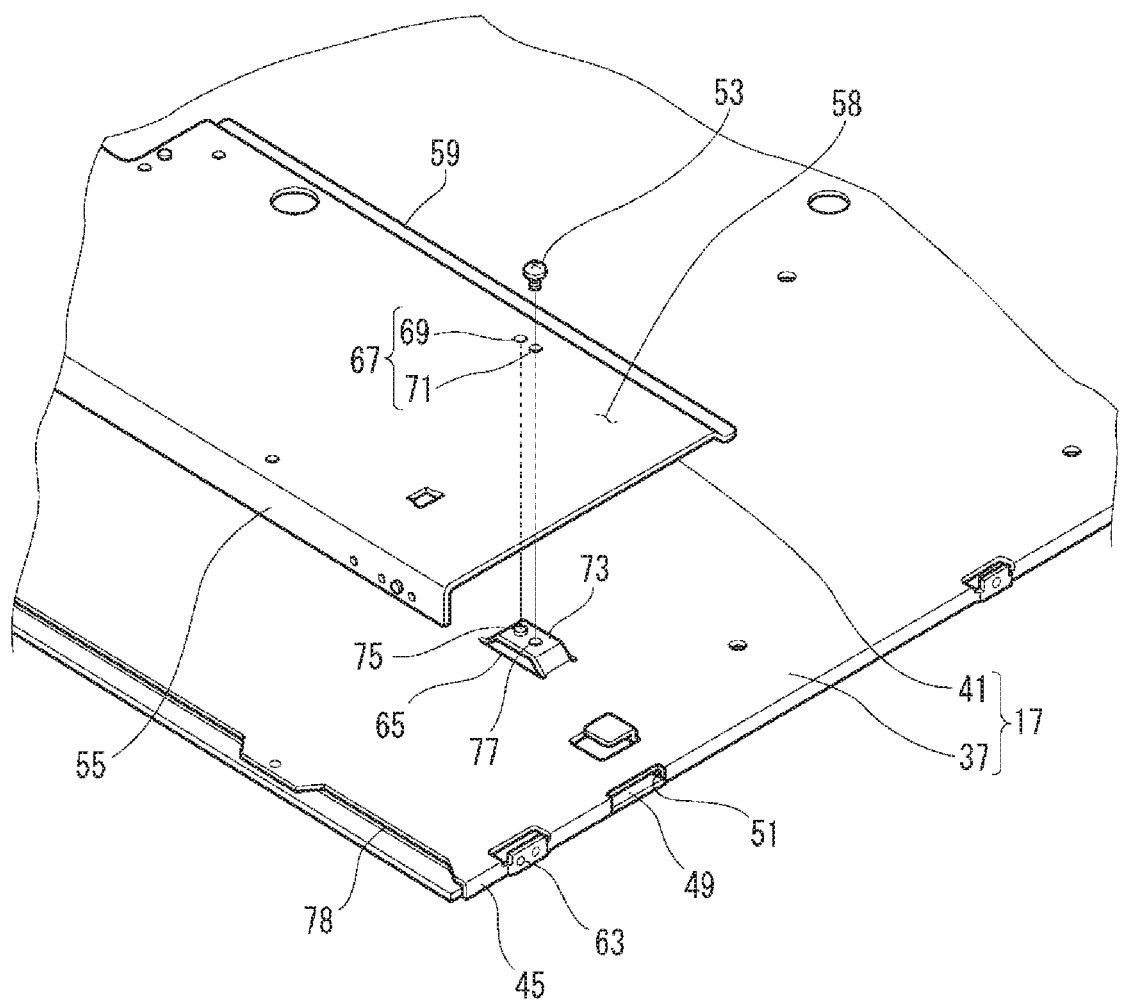
FIG. 9 is an exploded perspective view of a positioning portion between a bulging portion and the LED holding plate.

FIG. 9 is an exploded perspective view of a positioning portion 67 between a bulging portion 65 and the LED holding plate 41. A pair of positioning portions 67 each including a positioning hole 69 and a fastener insertion hole 71 are formed in the LED holding plate 41. The pair of positioning portions 67 are provided separately in a direction along the one end surface 31.

On the other hand, a pair of bulging portions 65 that protrude toward the LED holding plate 41 are formed on the back-side frame 37. The bulging portions 65 are also provided separately in the direction along the one end surface 31. Each of the bulging portions 65 includes a boss 75 fitted into a positioning hole 69 of the back-side frame 37 and a female screw portion 77 with which a screw 53 is screwed, on a tip end seating surface 73 that is a flat surface.

In the back-side frame 37, a side sandwiched between the pair of bent side plate portions 45 is one side portion 78. In other words, in the back-side frame 37, the bent side plate portions 45 that restrict a position of the light guiding plate 15 are respectively formed on a pair of side portions that sandwich the one side portion 78 along the one end surface 31. FFCs 25 connect the liquid crystal panel 13 to the relay substrate 27 arranged on front and back surfaces of the back-side frame 37 so as to straddle the one side portion 78. The back-side frame 37 does not form a bent portion on the one side portion 78, so that the FFCs 25 that connect the liquid crystal panel 13 disposed on a front surface side of the back-side frame 37 to the relay substrate 27 do not interfere with the bent portion. As a result, a thin structure in which the back-side frame 37 and the liquid crystal panel 13 can be close to each other is achieved.

Next, a positional relationship between the LEDs 21 and the light guiding plate 15 will be described using specific numerical values as an example.

Figure 10:
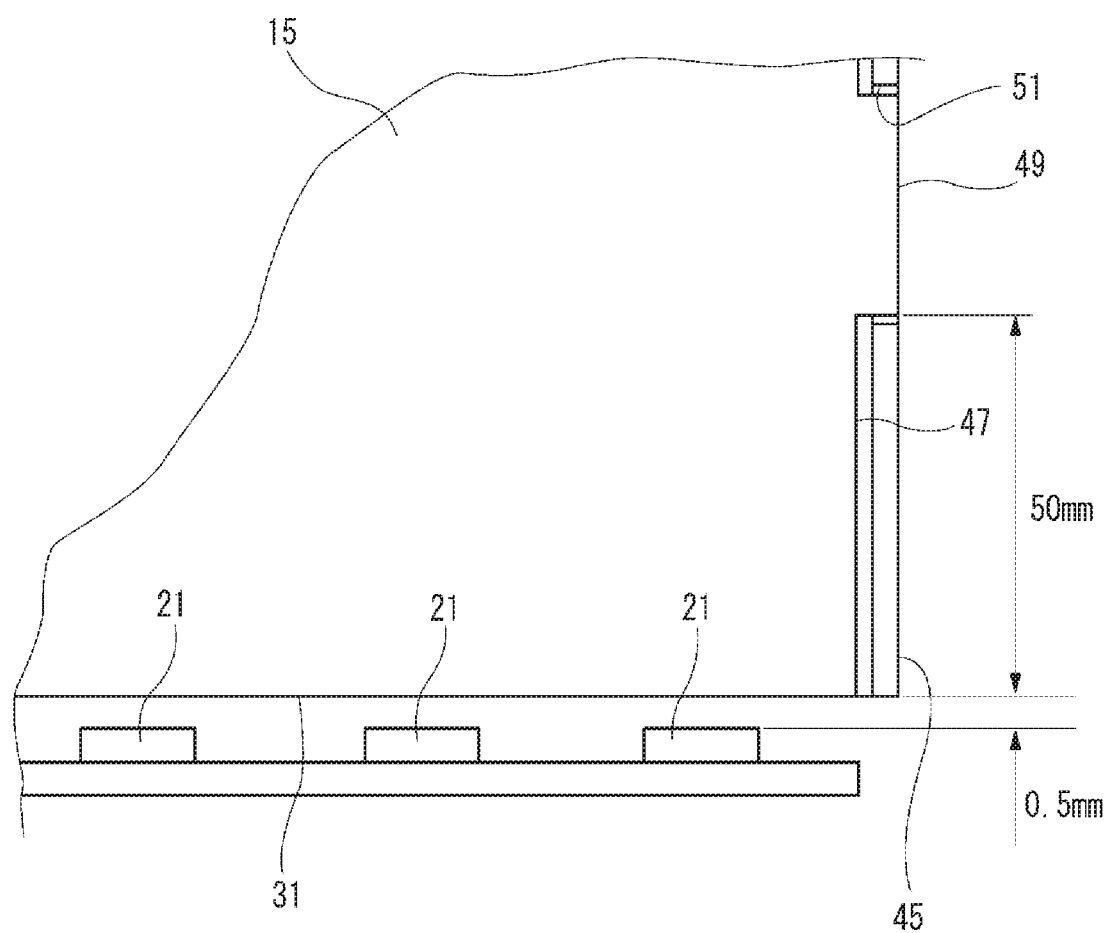
FIG. 10 is an enlarged plan view of main parts showing an example of positioning dimensions of LEDs and the light guiding plate.

FIG. 10 is an enlarged plan view of main parts showing an example of positioning dimensions of the LEDs 21 and the light guiding plate 15. In a positioning structure of the light guiding plate 15 and the LEDs 21, a gap between the one end surface 31 of the light guiding plate 15 and a light emitting surface of the LEDs 21 can be set to, for example, about 0.5 mm. In this case, a distance from the one end surface 31 to a convex portion 49 is set in the vicinity of, for example, about 50 mm.

Figure 11:
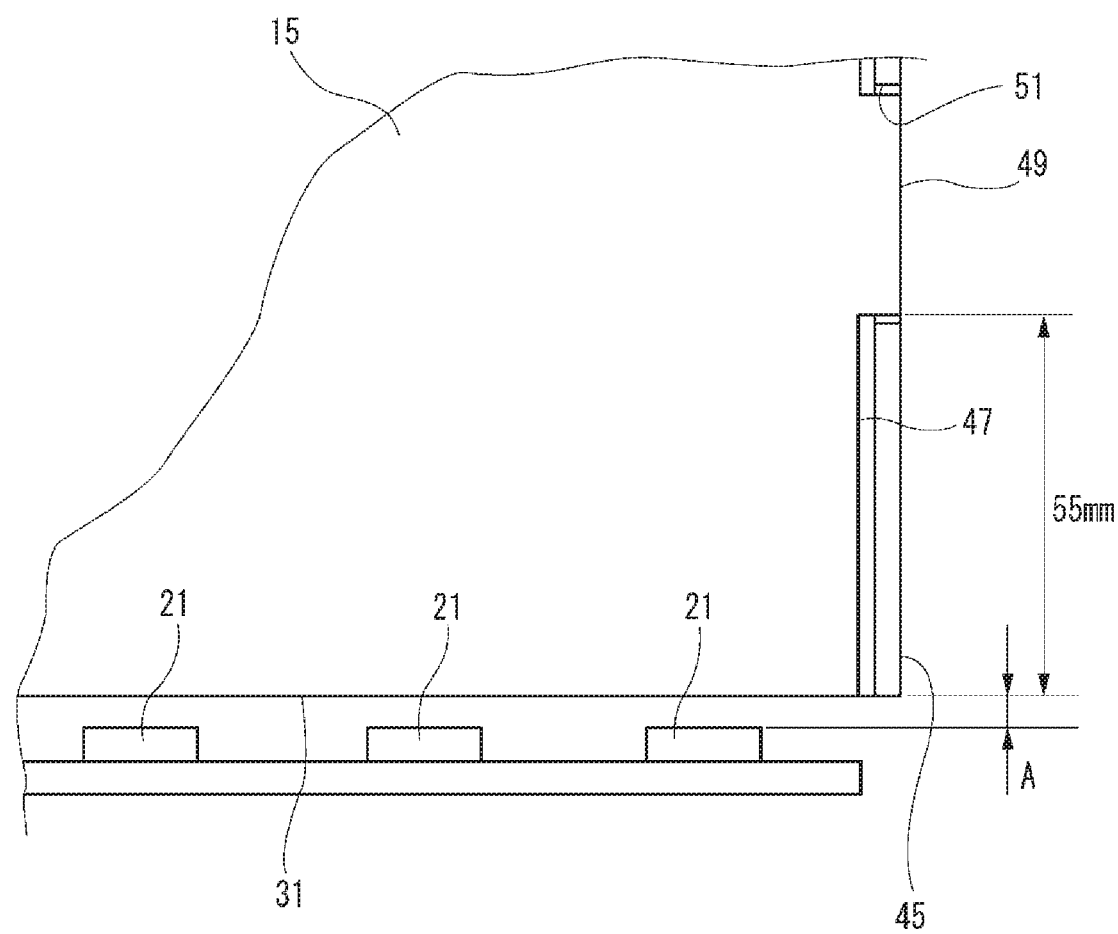
FIG. 11 is an operation illustrative view when a convex portion is relatively close to one end surface.

FIG. 11 is an operation illustrative view when the convex portion 49 is relatively close to the one end surface 31. Here, if the distance from the one end surface 31 to the convex portion 49 is 55 mm, a gap A when a temperature changes from 20° C. to 60° C. at a room temperature is 0.4 mm (an amount of change: 0.1 mm).

Figure 12:
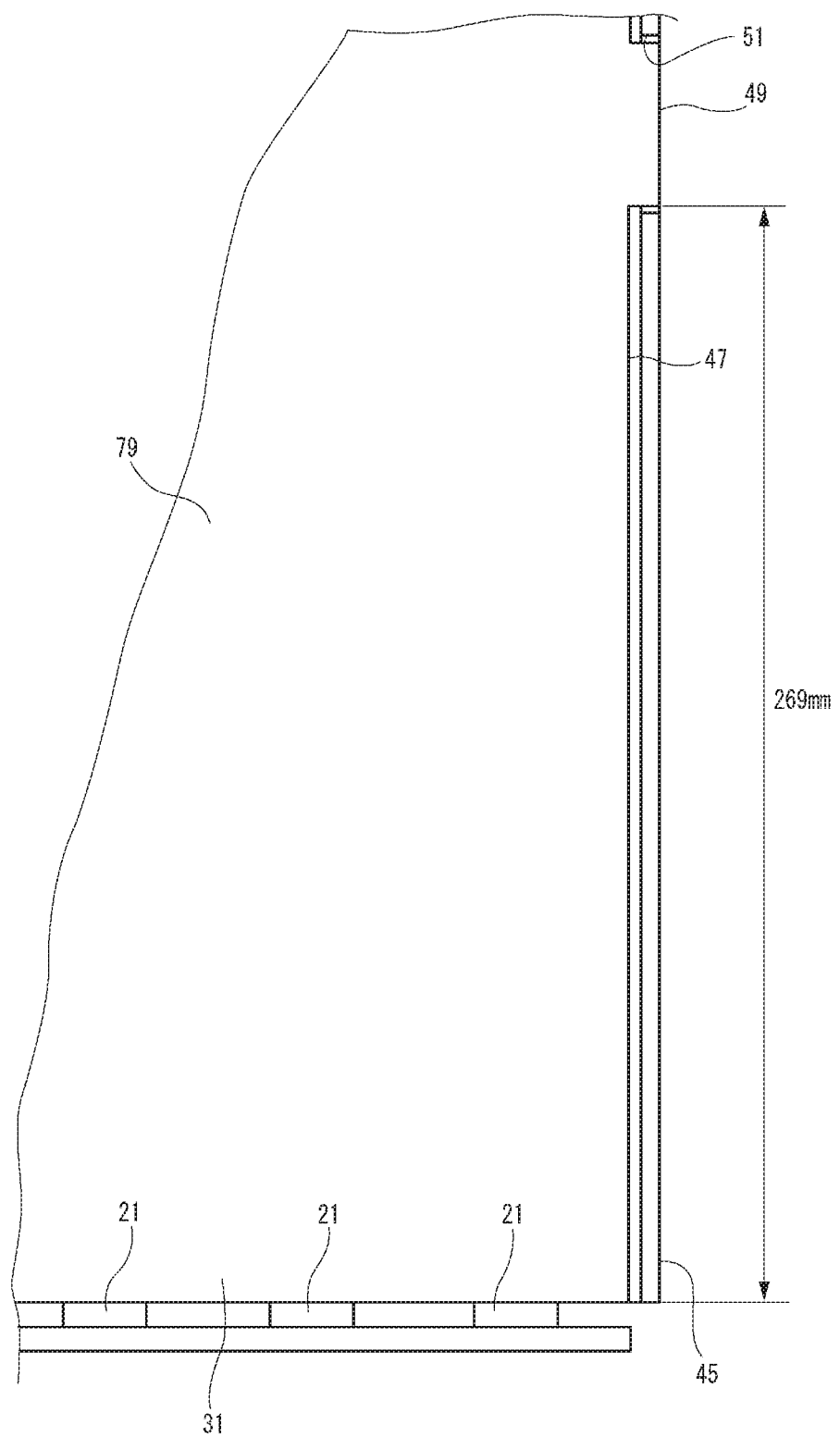
FIG. 12 is an operation illustrative view when the convex portion is relatively far from one end surface.

FIG. 12 is an operation illustrative view when the convex portion 49 is relatively far from the one end surface 31. A comparative example in which a position of the convex portion 49 is not in the vicinity of the one end surface 31 will be described.

In a light guiding plate 79 of the comparative example, the convex portion 49 is formed at a position of, for example, 269 mm from the one end surface 31. In the light guiding plate 79 according to the comparative example, when a temperature changes from 20° C. to 60° C. at a room temperature, the amount of change of the gap A becomes 0.5 mm or more. Therefore, the one end surface 31 of the light guiding plate 79 is in contact with the LEDs 21.

An amount of change due to a temperature change in the light guiding plate 15 shown in FIG. 11 and the light guiding plate 79 shown in FIG. 12 will be described.

Figure 13:
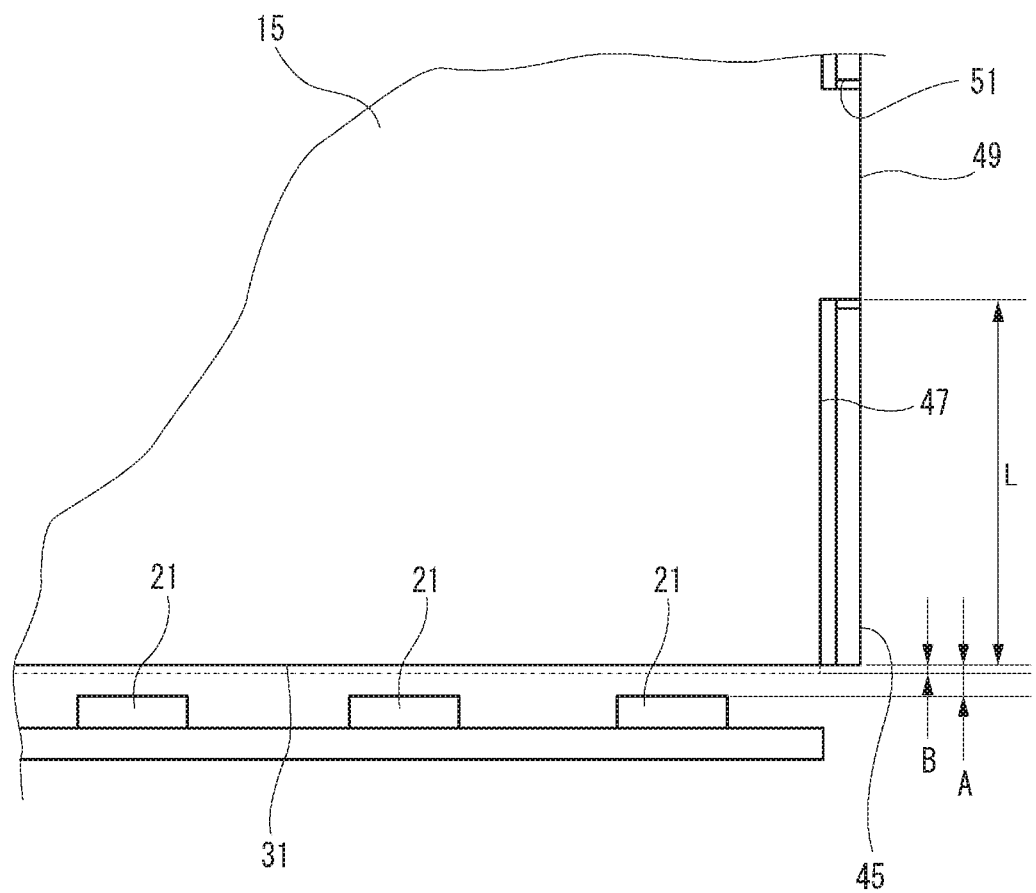
FIG. 13 is an operation illustrative view of one end surface that changes due to thermal expansion.

FIG. 13 is an operation illustrative view of the one end surface 31 that changes due to thermal expansion. In the figure, L is a distance from the one end surface 31 to the convex portion 49, A is a gap between the LED light emitting surface and the one end surface 31, and B is a dimensional change amount of an L value.

[Coefficient]

A linear expansion coefficient of the light guiding plate 15 (acrylic resin material) is $7 \times 10^{-5}/°$ C.

A linear expansion coefficient of the back-side frame 37 (aluminum material) is $2.35 \times 10^{-5}/°$ C.

[Calculation Formula 1]

An amount of change B of an L dimension when a temperature rises from 20° C. to 60° C. at a room temperature $$B = L \times (7-2.35) 10^{-5} \times (60-20)$$

[Calculation Formula 2]

The gap A between the LED light emitting surface and the one end surface 31 (a gap dimension at a room temperature is 0.5 mm)

$$A = 0.5 - B$$

[Calculation Example]
When L=55

$$B = 55 \times (7-2.35) 10^{-5} \times (60-20) = 0.1023 \text{ mm}$$

$$A = 0.5 - 0.1023 \approx 0.4 \text{ mm}$$

When L=269

$$B = 269 \times (7-2.35) 10^{-5} \times (60-20) = 0.500 \text{ mm}$$

$$A = 0.5 - 0.5 = 0$$

Figure 14:
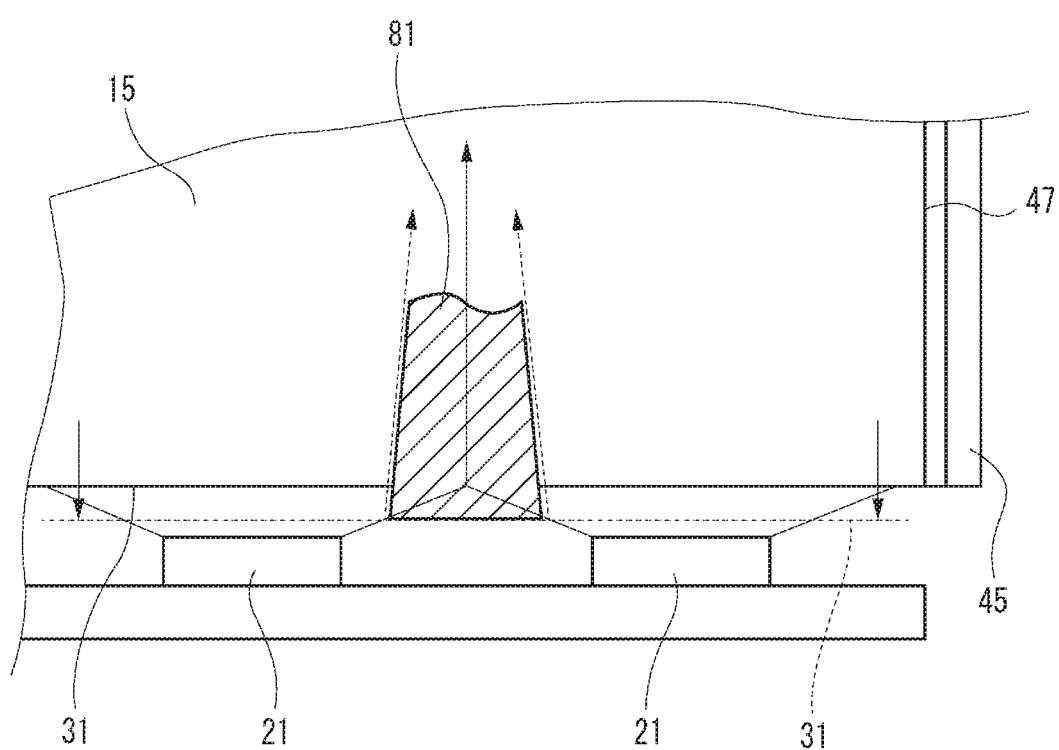
FIG. 14 is an operation illustrative view when one end surface is close to the LEDs.

FIG. 14 is an operation illustrative view when the one end surface 31 is close to the LEDs 21. Further, when the one end surface 31 of the light guiding plate 15 is close to the LEDs 21, a light non-incident region 81 where light from the LEDs 21 is not incident is generated. In this case, the light guiding plate 15 tends to cause unevenness in color and brightness on a surface facing the liquid crystal panel that emits light toward the liquid crystal panel 13.

Next, an operation of the liquid crystal display apparatus 11 according to the above-described first embodiment will be described.

The liquid crystal display apparatus 11 according to the first embodiment includes the quadrangular liquid crystal panel 13 having the reflection layer 23 on the back surface opposite to the display surface 29. The liquid crystal display apparatus 11 includes the light guiding plate 15 that is formed in the quadrangular shape substantially the same as that of the liquid crystal panel 13 and is laminated on the display surface 29, diffusely reflects light incident from the one end surface 31 and emits the light toward the display surface 29, and includes the pair of convex portions 49 that protrude outward from a vicinity of the one end surface 31 on the pair of parallel adjacent end surfaces 47 that sandwich the one end surface 31. The liquid crystal display apparatus 11 includes the frame 17 that has the LED holding plate 41 (an example of a light source holding plate) in which the plurality of LEDs 21 (an example of a light source) are mounted on the LED fixing plate 55, the plurality of LEDs 21 causing light to be incident on the one end surface 31, the LED fixing plate 55 being bent perpendicularly to the back-side frame 37 (an example of a back-side portion) and facing the one end surface 31, the back-side frame 37 being formed in the quadrangular shape substantially the same as that of the liquid crystal panel 13, in which the bent side plate portions 45 that face the pair of adjacent end surfaces 47 are respectively formed on the pair of adjacent side portions of the back-side frame 37 that sandwich the LED fixing plate 55, and in which the notches 51 into which the convex portions 49 are fitted are provided in the pair of bent side plate portions 45.

That is, in the light guiding plate 15 of the liquid crystal display apparatus 11, the convex portions 49 that protrude outward from the pair of adjacent end surfaces 47 are fitted into the notches 51 formed in the pair of bent side plate portions 45 of the back-side frame 37. The light guiding plate 15 and the frame 17 on which the LEDs 21 are mounted are positioned by a relative movement in a surface direction being restricted by the fitting of the convex portions 49 and the notches 51. The liquid crystal panel 13 is fixedly disposed on the light guiding plate 15. Accordingly, the light guiding plate 15 and the liquid crystal panel 13 can be positioned with simple components as compared with a related-art structure in which a plurality of frame-shaped members are used by stacking the frame-shaped members inside and outside.

Therefore, in the liquid crystal display apparatus 11 according to the first embodiment, positional deviation between the light source and the light guiding plate 15 for the front light can be prevented while achieving edge narrowing with simple components.

In the light guiding plate 15 and the back-side frame 37, the convex portions 49 provided on the light guiding plate 15 are respectively fitted into the notches 51 provided in the back-side frame 37. As a fitting structure, conversely, a fitting structure is also conceivable in which the convex portions 49 provided on the back-side frame 37 are respectively fitted into the notches 51 provided in the light guiding plate 15. In this case, since the notches 51 are provided in the light guiding plate 15, a defect occurs in waveguide of light. In order to obtain the same amount of light, the light guiding plate 15 has to be formed largely by that amount. On the contrary, in the configuration in which the convex portions 49 are provided on the light guiding plate 15, an outer shape of the light guiding plate 15 excluding the convex portions 49 can be made smaller than a case where the notches are provided, while obtaining the same amount of light. Accordingly, the light guiding plate 15 provided with the convex portions 49 can be made smaller, lighter, and reduced in a material cost as compared with the light guiding plate 15 provided with the notches.

Since the frame member 33, that holds a periphery of the light guiding plate 15 and the liquid crystal panel 13, does not have a positioning structure and positioning strength, the liquid crystal display apparatus 11 can be formed to be thin and have a narrow edge.

Further, the frame 17 includes the LED fixing plate 55 that is bent perpendicularly to the back-side frame 37 and faces the one end surface 31 of the light guiding plate 15. The LED fixing plate 55 is provided with the plurality of LEDs 21 along the one end surface 31 of the light guiding plate 15. The convex portions 49 and the notches 51 that position the light guiding plate 15 and the frame 17 are arranged in the vicinity of the one end surface 31 of the light guiding plate 15. The one end surface 31 of the light guiding plate 15 approaches (displaces) the LEDs 21 when the one end surface 31 is thermally expanded by driving of the LEDs 21 or the like. At this time, since a vicinity of the one end surface 31 of the light guiding plate 15 is fitted into and fixed to the notches 51 of the frame 17, an expansion amount between the one end surface 31 and the LEDs 21 is suppressed to be small.

An amount of change between the one end surface 31 and the LEDs 21 increases as a distance between the one end surface 31 and a convex portion 49 increases. In the liquid crystal display apparatus 11, since the convex portion 49 is disposed in the vicinity of the one end surface 31, the amount of change between the one end surface 31 and the LEDs 21 due to thermal expansion of the light guiding plate 15 is small. That is, in the liquid crystal display apparatus 11, it is possible to prevent positional deviation of both movement of the entire light guiding plate in the surface direction and displacement of the one end surface 31 with respect to the LEDs 21 due to the thermal expansion of the light guiding plate 15.

The liquid crystal display apparatus 11 according to the first embodiment includes the quadrangular liquid crystal panel 13 having the reflection layer 23 on the back surface opposite to the display surface 29. The liquid crystal display apparatus 11 includes the light guiding plate 15 that is formed in the quadrangular shape substantially the same as that of the liquid crystal panel 13 and is laminated on the display surface 29, and diffusely reflects the light incident from the one end surface 31 and emits the light toward the display surface 29. The liquid crystal display apparatus 11 includes the back-side frame 37 that is formed in the quadrangular shape substantially the same as that of the liquid crystal panel 13 and sandwiches the liquid crystal panel 13, that is disposed in parallel with the liquid crystal panel 13 on the side opposite to the light guiding plate 15, and in which the bent side plate portions 45 that restrict the position of the light guiding plate 15 are respectively formed on the pair of side portions that sandwich the one side portion 78 along the one end surface 31. The liquid crystal display apparatus 11 includes the LED holding plate 41 that is formed separately from the back-side frame 37, in which the LEDs 21 that cause light to be incident on the one end surface 31 are mounted on the LED fixing plate 55 that faces the one end surface 31, and in which the back-side frame fixing plate portion 58 formed by being bent perpendicularly to the LED fixing plate 55 is fixed to the surface of the back-side frame 37 on the side opposite to the liquid crystal panel 13.

Figure 15:
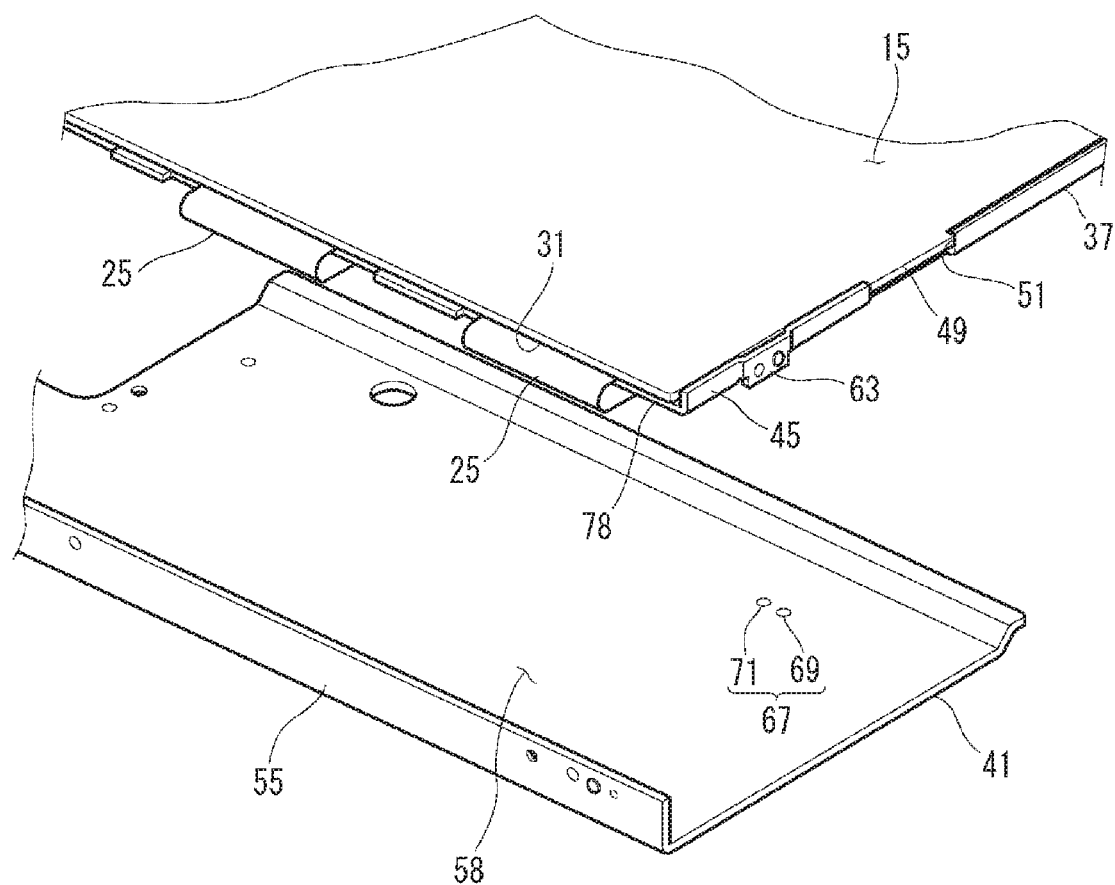
FIG. 15 is an exploded perspective view illustrating reinforcing one side portion of a back-side frame.

FIG. 15 is an exploded perspective view illustrating reinforcing the one side portion 78 of the back-side frame 37. In the liquid crystal display apparatus 11, the frame 17 includes two members: the back-side frame 37 and the LED holding plate 41 (see FIG. 2). Since the back-side frame 37 and the LED holding plate 41 are separate bodies, the LED holding plate 41 can be integrally fixed to the back-side frame 37 along the one side portion 78. The LED holding plate 41 is formed in an L-shape in which the back-side frame fixing plate portion 58 is perpendicularly bent with respect to the LED fixing plate 55. As a result, in the back-side frame 37, the one side portion 78 where a bent portion cannot be formed is reinforced by the L-shaped integrally fixed LED holding plate 41. The back-side frame 37 to which the LED holding plate 41 is fixed is restricted from bending toward front and back surface sides while achieving a reduction in thickness without blocking lead-out of the FFCs 25 from the laminated liquid crystal panel 13. That is, the liquid crystal display apparatus 11 can secure strength of an apparatus while achieving the reduction in thickness.

In the frame 17, the back-side frame 37 and the LED holding plate 41, which are separately formed, are integrally fixed by the screws 53 (an example of a fastener).

In the liquid crystal display apparatus 11, the frame 17 includes two members: the back-side frame 37 and the LED holding plate 41. Since the back-side frame 37 and the LED holding plate 41 are separate bodies, workability of assembling the liquid crystal panel 13 and the light guiding plate 15 to the frame 17 is satisfactorily achieved as compared with a case where the frame 17 is integrated. That is, after the back-side frame 37, the liquid crystal panel 13 and the light guiding plate 15 are positioned and assembled, the LED holding plate 41 can be fixed to the back-side frame 37 by covering the relay substrate 27 and the like provided on the back-side frame 37.

The back-side frame 37 and the LED holding plate 41 are formed as separate bodies, so that the back-side frame 37 and the LED holding plate 41 can be formed of metal plates having different thicknesses.

The pair of positioning portions 67 each including the positioning hole 69 and the fastener insertion hole 71 are provided on the LED holding plate 41 so as to be separate from each other in a direction along the one end surface 31. The back-side frame 37 is provided with the pair of bulging portions 65 each including the boss 75 fitted into the positioning hole 69 and the female screw portion 77 with which a fastener is screwed on the tip end seating surface 73 that protrudes toward the LED holding plate 41 and has a flat surface.

In the liquid crystal display apparatus 11, the bulging portions 65 that protrude toward the LED holding plate 41 are provided on the back surface of the back-side frame 37. The boss 75 and the female screw portion 77 are formed on the tip end seating surface 73 of the bulging portion 65. The pair of bosses 75 are separately provided in the direction along the one end surface 31. Accordingly, the light guiding plate 15 can effectively prevent positional deviation in which the one end surface 31 that faces the LEDs 21 rotates about a rotation axis perpendicular to the light guiding plate 15 at a fixed position.

Since the boss 75 provided on the tip end seating surface 73 of the bulging portion 65 can be fitted into the positioning hole 69 of the LED holding plate 41 with high accuracy, positioning accuracy can be improved as compared with a positioning and fixing structure using only a fastener.

The bulging portion 65 can be formed on the back-side frame 37 by drawing. Therefore, it is possible to secure a screwing space at a tip end of a fastener and prevent the tip end of the fastener from interfering with the liquid crystal panel 13 without using a separate member. Further, between the back-side frame 37 and the LED holding plate 41, a gap that can house a component corresponding to a protruding height of the bulging portions 65 can be easily formed.

The light guiding plate 15 is closely fixed to the display surface 29 of the liquid crystal panel 13 via the adhesive layer 57.

In the liquid crystal display apparatus 11, the light guiding plate 15 and the liquid crystal panel 13 are closely fixed via the adhesive layer 57, so that an integrated structure having higher strength than that in a case where each of the light guiding plate 15 and the liquid crystal panel 13 is a single item can be formed. Further, the light guiding plate 15 can be brought into close contact with the display surface 29 of the liquid crystal panel 13 evenly by the adhesive layer 57, and an air gap can be prevented from being formed between the liquid crystal panel 13 and the light guiding plate 15. Accordingly, by using the adhesive layer 57 having a particularly low refractive index (a layer made of silicon or the like), double reflection can be prevented.

In the liquid crystal display apparatus 11, the back-side frame 37 and the liquid crystal panel 13 are not fixed to each other.

In the liquid crystal display apparatus 11, when the back-side frame 37 and the liquid crystal panel 13 are temporarily fixed and the liquid crystal panel 13 and the light guiding plate are thermally expanded, a reaction force received from the back-side frame 37 can be prevented from being applied to the fitting structure of the convex portions 49 and the notches 51. Accordingly, positional deviation between the one end surface 31 of the light guiding plate 15 and the LEDs 21 due to an excessive stress being applied to the fitting structure of the convex portions 49 and the notches 51 can be prevented.

In the liquid crystal display apparatus 11, the LED holding plate 41 is formed of a metal plate thicker than a plate thickness of the back-side frame 37.

In the liquid crystal display apparatus 11, only the LED holding plate 41 that supports an entire load of the liquid crystal display apparatus 11 can be made of a small and thick plate material, and the back-side frame 37 that mainly holds the light guiding plate 15 and the liquid crystal panel 13 can be made of a plate material thinner than the LED holding plate 41. Accordingly, a thickness of the back-side frame 37 can be reduced as compared with a case where the back-side frame 37 and the LED holding plate 41 are configured to have the same plate thickness, so that a weight of the apparatus can be reduced.

Further, by making the LED holding plate 41 thick, a thermal capacity can be increased as compared with a thin plate material. Accordingly, heat dissipation performance of the LEDs 21 can be improved by improving thermal conduction from the LEDs 21. As a result, a life of the LEDs 21 can be extended.

In the liquid crystal display apparatus 11, the relay substrate 27 is fixed to the surface on the side opposite to the liquid crystal panel 13 of the back-side frame 37, and the other end of each FFC 25 having one end connected to the liquid crystal panel 13 is connected to the relay substrate 27 across the one side portion 78 of the back-side frame 37.

Figure 16:
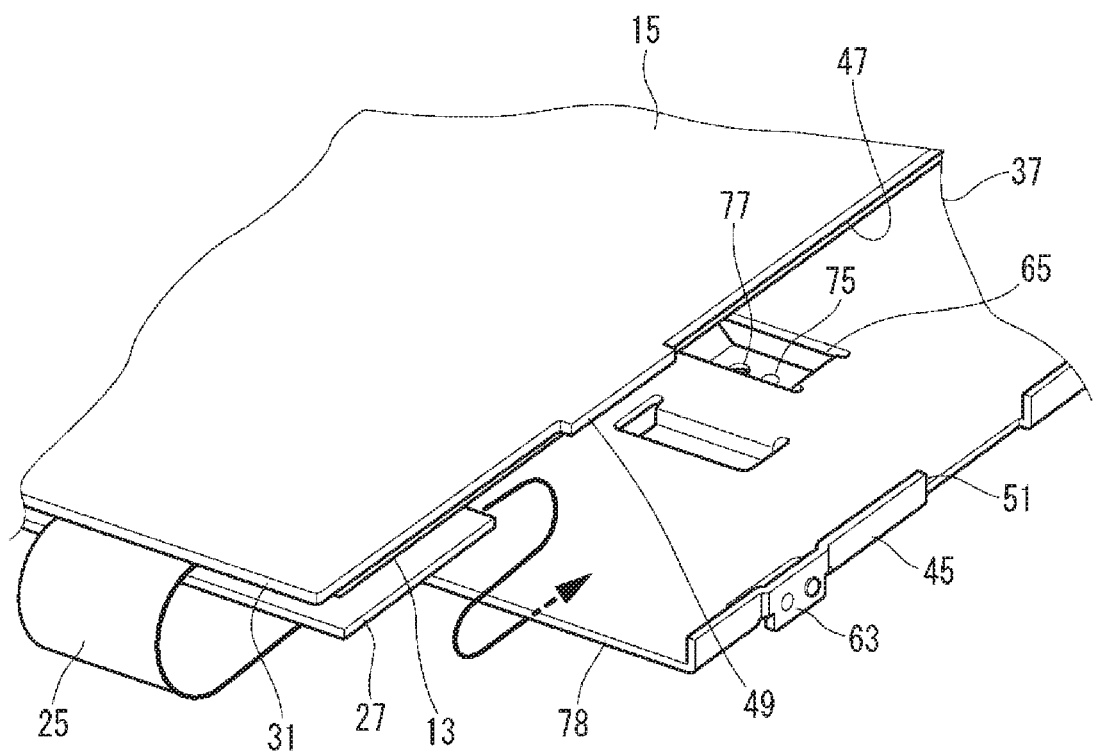
FIG. 16 is an exploded perspective view illustrating a structure in which a flexible wiring substrate connected to a liquid crystal panel is connected to a relay substrate across one side portion.

FIG. 16 is an exploded perspective view illustrating a structure in which an FFC 25 connected to the liquid crystal panel 13 is connected to the relay substrate 27 across the one side portion 78. In the liquid crystal display apparatus 11, the liquid crystal panel 13 and the relay substrate 27 are arranged on front and back sides of the back-side frame 37. The FFC that connects the liquid crystal panel 13 to the relay substrate 27 is wired across the one side portion 78 of the back-side frame 37. Accordingly, the liquid crystal panel 13 and the relay substrate 27 can be easily connected to each other without forming a notch or a through hole in the back-side frame 37. Further, since no notch or through hole is formed in the back-side frame 37, a decrease in strength of the back-side frame 37 can be prevented.

In the liquid crystal display apparatus 11, the component housing space 61 is provided between the back-side frame 37 and the LED holding plate 41.

In the liquid crystal display apparatus 11, the Z-bent portion 59 is formed on an end edge of the back-side frame fixing plate portion 58 on a side opposite to the LED fixing plate 55, and the Z-bent portion 59 abuts against the back-side frame 37, so that the component housing space 61 that houses the relay substrate 27 is formed between the back-side frame 37 and the back-side frame fixing plate portion 58.

In the liquid crystal display apparatus 11, the Z-bent portion 59 formed on the end edge of the back-side frame fixing plate portion 58 abuts against the back-side frame 37, so that the back-side frame fixing plate portion 58 floats above the back-side frame 37 and is fixed. A gap formed by the back-side frame fixing plate portion 58 floating above the back-side frame 37 is the component housing space 61. In the liquid crystal display apparatus 11, it is possible to secure a thin and wide space over an entire area of an overlapping portion by only securing a relatively small gap in the overlapping portion between the back-side frame 37 and the LED holding plate 41. Accordingly, the overlapping portion between the back-side frame 37 and the LED holding plate 41 is effectively used, and it is possible to easily secure a space for housing a thin and relatively large-sized component such as a substrate while avoiding interference with other components.

In the liquid crystal display apparatus 11, the relay substrate 27 is fixed close to the one side portion 78, and the Z-bent portion 59 is formed close to the relay substrate 27.

In the liquid crystal display apparatus 11, it is possible to prevent an increase in a connection length of the FFC 25 led out from the liquid crystal panel 13 and connected to the relay substrate 27. Further, the component housing space 61 can be made compact.

In the liquid crystal display apparatus 11, the LED holding plate 41 is formed of a metal material having a higher thermal conductivity than that of the back-side frame 37.

In the liquid crystal display apparatus 11, heat from the LEDs 21 fixed to the LED fixing plate 55 is satisfactorily transferred from the LED fixing plate 55 to the back-side frame fixing plate portion 58. That is, the LED holding plate 41 has a small thermal gradient (temperature difference) on an entire surface, and an efficient heat dissipation effect can be obtained even at an end portion. As a result, a cooling effect of the LEDs 21 can be enhanced, and the life of the LEDs 21 can be extended.

As described above, according to the liquid crystal display apparatus 11 having the above-described configuration, since the back-side frame 37 and the LED holding plate 41 are separately fixed, a reduction in thickness, heat dissipation performance, and a protective structure of the FFCs 25 can be simultaneously achieved while increasing strength of an apparatus. Particularly, the liquid crystal display apparatus 11 can secure the protective structure of the FFCs 25 when handled as a unit in an intermediate stage of a finished product.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be naturally understood that they also belong to the technical scope of the present disclosure. Components in the various embodiments described above may be combined optionally in the range without deviating from the spirit of the invention.

This application is a continuation of PCT application No. PCT/JP2019/012244, which was filed on Mar. 22, 2019 based on Japanese Patent Application (No. 2018-086778) filed on Apr. 27, 2018, the contents of which are incorporated herein by reference.

The present disclosure is useful as a liquid crystal display apparatus that secures strength of an apparatus while achieving a thin structure in which a liquid crystal panel and a back-side frame can be close to each other.

What is claimed is:

1. A liquid crystal display apparatus comprising:
   a quadrangular liquid crystal panel having a reflection layer on a back surface opposite to a display surface of the liquid crystal panel;
   a light guiding plate formed in a quadrangular shape substantially the same as that of the liquid crystal panel, being laminated on the display surface, and configured to diffusely reflect light incident from one end surface of the light guiding plate and emit the light toward the display surface;
   a back-side frame formed in a quadrangular shape substantially the same as that of the liquid crystal panel, configured to sandwich the liquid crystal panel, and disposed in parallel with the liquid crystal panel on a side opposite to the light guiding plate, wherein bent side plate portions that restrict a position of the light guiding plate are respectively provided on a pair of side portions that sandwich one side portion of the back-side frame along the one end surface; and
   a light source holding plate including:
   a light source fixing plate that faces the one end surface; and
   a fixing plate portion that is fixed to a surface of the back-side frame on a side opposite to the liquid crystal panel,
   wherein a light source that causes light to be incident on the one end surface is mounted on the light source fixing plate, and the fixing plate portion is formed so as to be bent perpendicularly to the light source fixing plate.

2. The liquid crystal display apparatus according to claim 1,
   wherein a relay substrate is fixed to the surface of the back-side frame on the side opposite to the liquid crystal panel; and
   wherein the other end of the wiring substrate having one end connected to the liquid crystal panel is connected to the relay substrate across the one side portion of the back-side frame.

3. The liquid crystal display apparatus according to claim 2,
   wherein a Z-bent portion is formed on an end edge of the fixing plate portion on a side opposite to the light source fixing plate; and
   wherein the Z-bent portion abuts against the back-side frame, and a component housing space for housing the relay substrate is formed between the back-side frame and the fixing plate portion.

4. The liquid crystal display apparatus according to claim 3,
   wherein the relay substrate is fixed close to the one side portion; and
   wherein the Z-bent portion is formed close to the relay substrate.

5. The liquid crystal display apparatus according to claim 1,
   wherein the light source holding plate is formed of metal material having a higher thermal conductivity than that of the back-side frame.

6. The liquid crystal display apparatus according to claim 1,
   wherein the light source holding plate is formed of a metal plate thicker than a plate thickness of the back-side frame.

* * * * *